Patented Apr. 8, 1947

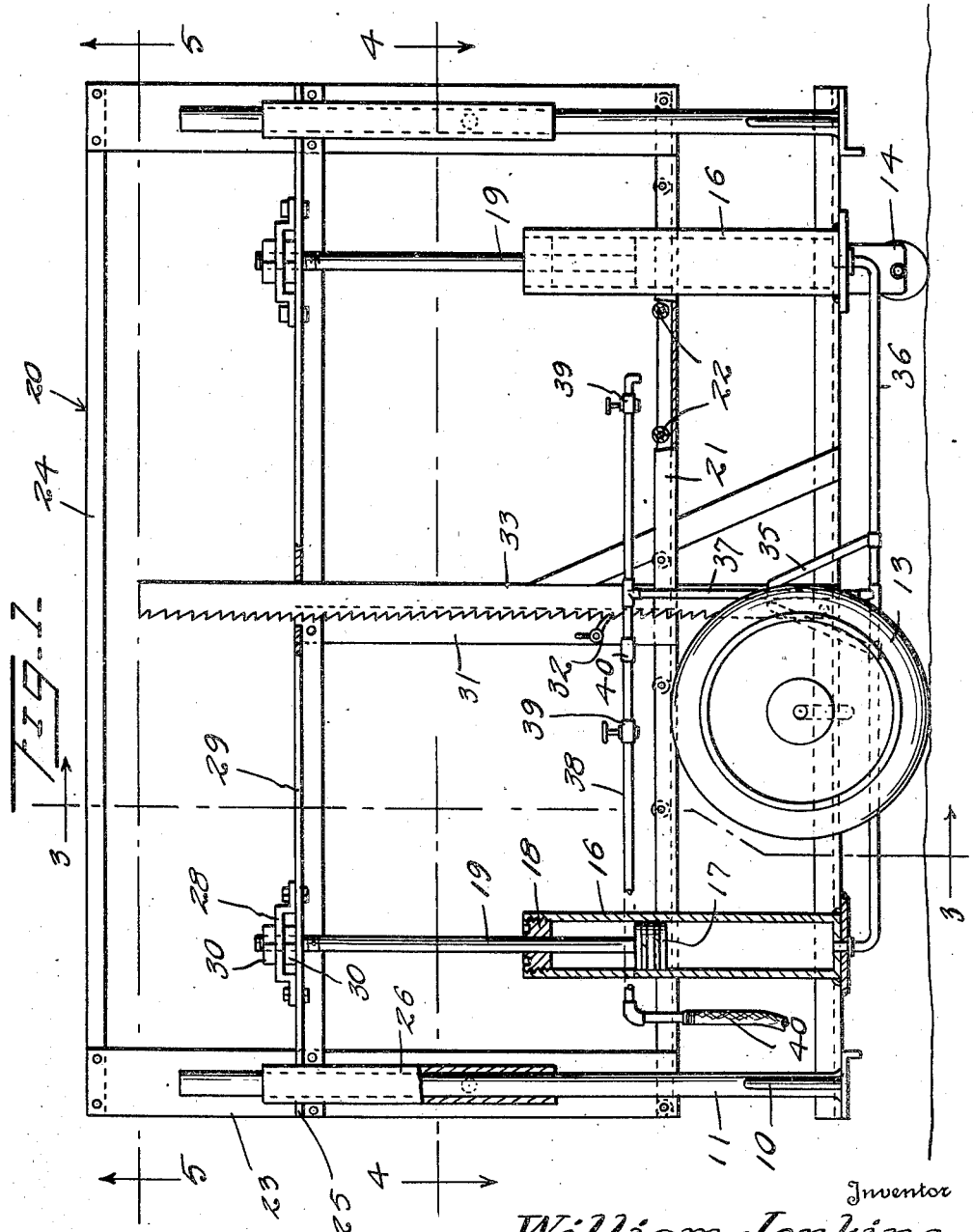

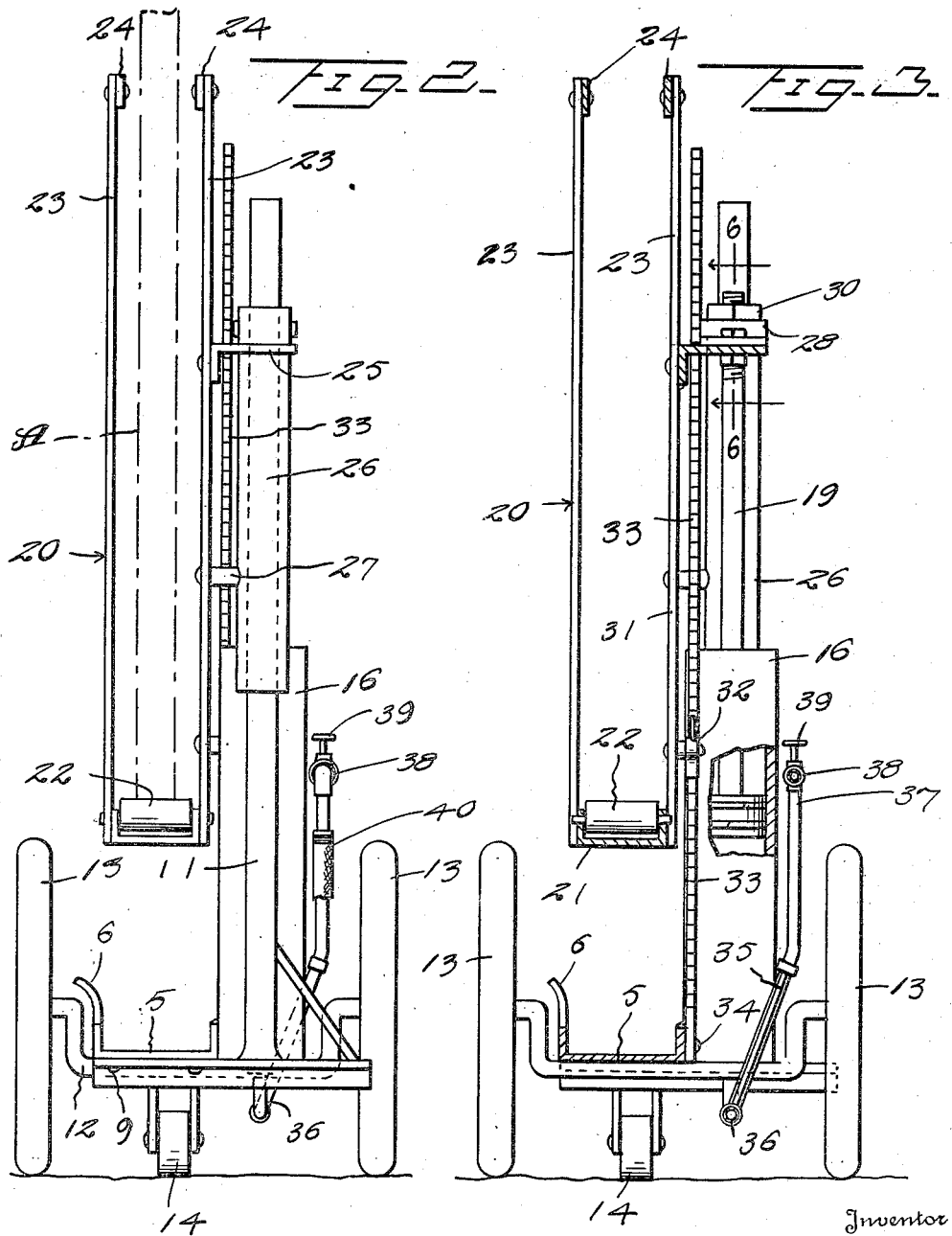

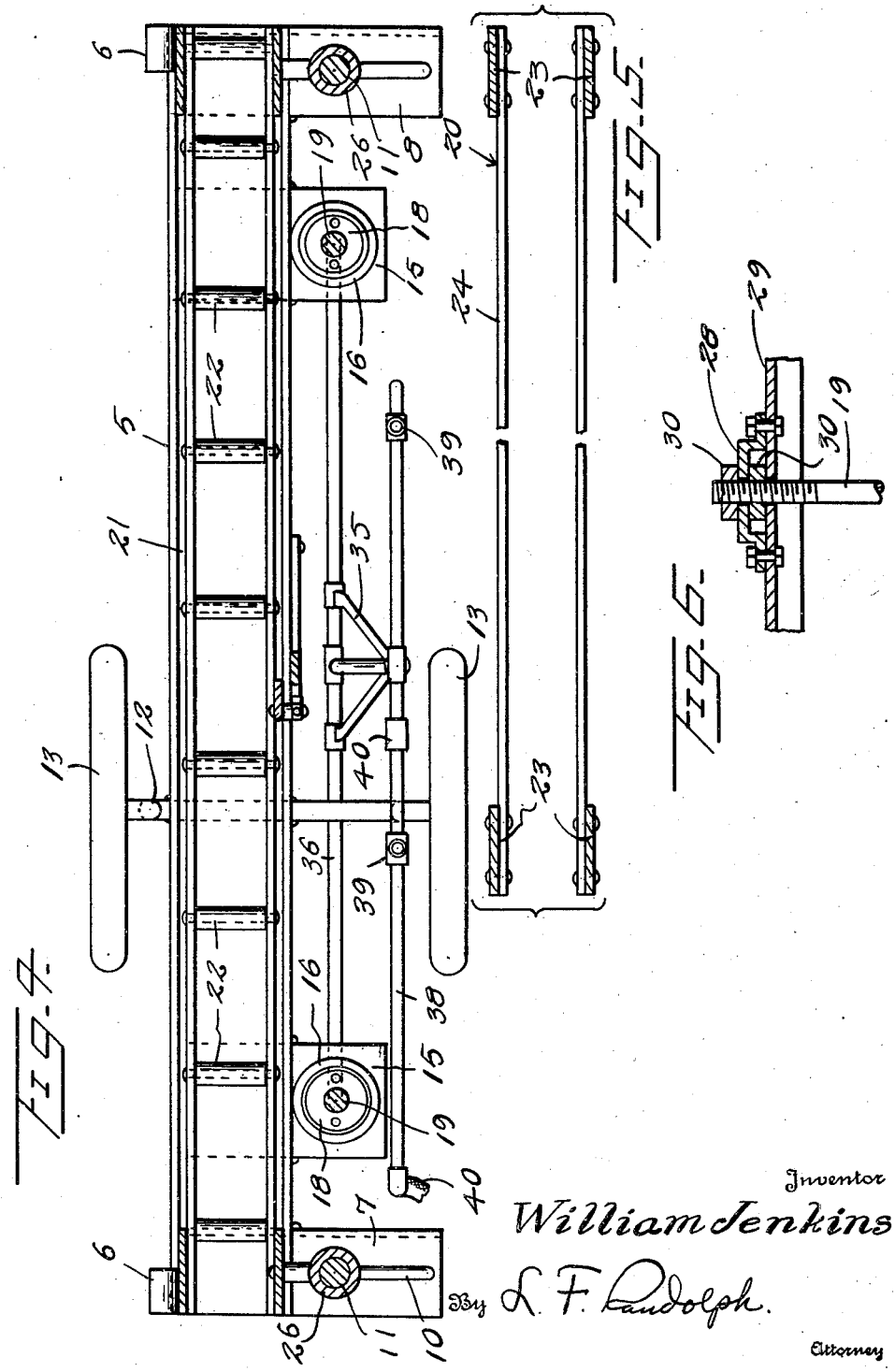

2,418,586

UNITED STATES PATENT OFFICE 2,418,586

CAR DOOR HANGING TRUCK

William Jenkins, Los Angeles, Calif.

Application October 6, 1944, Serial No. 557,464

3 Claims. (Cl. 214—1)

This invention appertains to a new and useful improvement in trucks and more particularly to a truck especially adapted for handling railroad box car doors, the principal object being to provide a truck having an air lift thereon whereby a box car door can be transported to a box car and elevated to the proper position in order that it may be easily disposed into the usual box car door runway.

Another important object of the invention is to provide a box car door handling truck which in use will greatly reduce the amount of manpower necessary to applying and removing box car doors.

A further object of the invention is to provide a box car door handling truck which in use will be safe in all respects reducing to a considerable extent the possibility of personal injuries which now occur in the handling of heavy doors.

Various other important objects and advantages of the invention shall become apparent to the reader of the following description.

In the drawings:

Figure 1 is a side elevational view of the truck with one of the air cylinders in section.

Figure 2 is an end elevational view of the truck.

Figure 3 is a vertical sectional view taken substantially on line 3—3 of Figure 1.

Figure 4 is a horizontal sectional view taken substantially on line 4—4 of Figure 1.

Figure 5 is a fragmentary horizontal sectional view taken on line 5—5 of Figure 1.

Figure 6 is a fragmentary detailed sectional view taken on line 6—6 of Figure 3.

Referring to the drawings wherein like numerals designate like parts, it can be seen that the truck includes an elongated trough 5 having outwardly curved upstanding guide fingers 6 at the outer sidewall thereof.

Angle plates 7, 8 are riveted or otherwise secured as at 9 to ends of the trough 5 and each projects laterally beyond one side of the trough.

Rising from the plate 7, 8 and supported by brace members 10 are guide posts 11.

An underslung axle 12 has truck supporting wheels 13 at the ends thereof. Sufficiently removed from the wheels 13 is a castor wheel assembly 14 suitably mounted under the truck.

Projecting laterally from under the trough 5 at points inwardly of the plates 7, 8 are plates 15, 15 from which rise air cylinders 16, 16, each of which has a piston 17 therein, and from each of these pistons 17 and through a lug 18 in the top of the corresponding cylinder extends a rod 19.

A rack 20 is provided on the truck for supporting a box car door A. This rack is made up of an elongated channel member 21 having rollers 22 mounted for rotation therein.

The fingers 6 serve to assist in guiding the rack 20 to rest position on the trough 5.

Rising from each end of each of the sidewalls of the trough member 21 is a bar 23, corresponding bars at the same side of the trough 21 being connected by bridge members 24 suitably secured at their ends to the upper ends of the bars 23. The foregoing defines a rack made up of open side frames, this rack being open at its top and at each end so that a box car door can be readily inserted to rest upon the rollers 22.

Brackets 25 project laterally from the inner rack bars 23 and upwardly through these brackets extend tubes 26 in which the guide posts 11 are slidable. Each of the tubes 26 is further secured in place by a connector 27 interposed between itself and the corresponding rack bar 23.

Risers 28 are provided on a bridge member 29 between the inner bars 23 of the rack 20 and upwardly through the bridge member 29 and the risers 28 project the upper ends of the piston rods 19. Nuts 30 are provided on each piston rod 19 above and below the corresponding riser 28 so as to affix the position of this end of the rod.

A vertical column 31 has its upper ends secured to the bridge member 29 and its lower into one side of the channelled member 21 and this carries a dog 32 engageable with a vertically disposed ratchet bar 33 which is secured as at 34 to the inner side of the trough 5. (See Figure 3.)

Brace members 35 serve to support a horizontal pipe 36 underlying the truck and which has its ends connected to the bottoms of the cylinders 16. A pipe 37 rises from the pipe 36 and communicates with a horizontal pipe 38 which has a bleed cock 39 at one end while its opposite end is connected to a supply air hose 40 through which air pressure is supplied to the cylinders of the truck.

On the supply side of the connection of the pipe 38 to the pipe 37, the pipe 38 has a cut-off valve 39 therein and also a check valve 40.

In the operation of this apparatus, it can be seen that with the rack 20 lowered to the trough 5, a box car door can be moved into the rack 20 and the truck may then be moved to the box car on which the door is to be placed.

When the box car has been reached, and it is necessary to elevate the door to the proper elevation so as to slide the same to the usual guide ways on the car intended for the door, the air system is brought into use. First the bleed cock 39 is closed, after which the shut off valve 39 is opened, permitting air under pressure to pass through the pipe 39 and check valve 40 to the pipe 37 and from there to the pipe 36. The air under pressure then passes into the cylinders 16, raising the pistons 17 and elevating the rack 20 uniformly due to the connection of the piston rods 19 with the rack. As the rack is elevated, the dog 32 will ride over the teeth of the ratchet bar 33 and when the proper elevation of the rack 20 has been reached, the dog 32, which is properly spring pressed, will engage the ratchet bar 33 and prevent the return of the rack, holding the rack in the desired position so that the door can be pushed along the rollers 22 and into the door guide way of the box car.

In order to lower the rack 20, it is only necessary that the bleed cock 39 be opened and the dog 32 released from the ratchet bar 33, this obviously after the shut-off valve 39 has been closed.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:

1. A box car door moving truck comprising a wheeled support, air cylinders on the support, a door receiving rack, guide means for the rack, said air cylinders being provided with pistons operative therein and rods extending from the pistons and connected to the said rack, a trough mounted on the support for receiving the lower portion of the rack and guide means on the trough for said rack.

2. A box car door moving truck comprising a wheeled support, air cylinders on the support, a door receiving rack, guide means for the rack, said air cylinders being provided with pistons operative therein and rods extending from the pistons and connected to the rack, a trough mounted on the support for receiving the lower portion of the rack, said trough consisting of a channeled member being provided with upwardly and outwardly disposed guide arms.

3. A box car door moving truck comprising a wheeled support, air cylinders on the support, a door receiving rack, guide means for the rack, said air cylinders being provided with pistons operative therein and rods extending from the pistons and connected to the rack, a trough mounted on the support for receiving the lower portion of the rack, said trough consisting of a channeled member being provided with upwardly and outwardly disposed guide arms, and a bed for the support and underslung axles for the wheels of the wheeled support.

WILLIAM JENKINS.

REFERENCES CITED

The following references are of record in the file of this patent:

UNITED STATES PATENTS

| Number | Name | Date |
|---|---|---|
| 698,896 | Beierstorf | Apr. 29, 1902 |
| 713,843 | Bouck | Nov. 18, 1902 |
| 1,227,646 | Metz | May 29, 1917 |
| 1,802,227 | Welter | Apr. 21, 1931 |
| 794,262 | Ten Eyck | July 11, 1905 |
| 1,447,242 | Fritz | Mar. 6, 1923 |
| 1,555,103 | Christian | Sept. 29, 1925 |